US009840173B2

(12) United States Patent
Murthy (10) Patent No.: US 9,840,173 B2
(45) Date of Patent: Dec. 12, 2017

(54) REMOVABLE VEHICLE SEATING (71) Applicant: Toyota Motor Engineering & Manufacturing North America, Inc., Erlanger, KY (US)

(72) Inventor: Vasudeva S. Murthy, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 208 days.

(21) Appl. No.: 14/934,795

(22) Filed: Nov. 6, 2015

(65) Prior Publication Data
US 2017/0129441 A1    May 11, 2017

(51) Int. Cl.
| B60R 21/16 | (2006.01) |
| B60N 2/68 | (2006.01) |
| B60N 2/015 | (2006.01) |
| B60R 21/207 | (2006.01) |

(52) U.S. Cl.
CPC ............. B60N 2/682 (2013.01); B60N 2/015 (2013.01); B60R 21/207 (2013.01)

(58) Field of Classification Search
CPC ...... B60N 2/4235; B60N 2/4249; B60N 2/68; B60R 21/207
USPC ............ 280/730.2; 297/216.1, 216.3, 216.13
See application file for complete search history.

(56) References Cited

U.S. PATENT DOCUMENTS

| 5,601,332 | A | 2/1997 | Schultz et al. |
| 5,746,443 | A | 5/1998 | Townsend |
| 5,947,630 | A | 9/1999 | Dillon |
| 6,217,062 | B1 * | 4/2001 | Breyvogel ............... B60N 2/68 |
| | | | 280/728.2 |
| 6,338,527 | B1 * | 1/2002 | Toyota ................. B60N 2/6054 |
| | | | 297/219.1 |
| 7,677,598 | B1 * | 3/2010 | Ryan ....................... B60R 21/18 |
| | | | 280/730.2 |
| 8,534,701 | B2 | 9/2013 | Sosnowski et al. |
| 8,534,702 | B2 | 9/2013 | Suzuki |
| 8,668,225 | B2 * | 3/2014 | Yamaki ................ B60N 2/4235 |
| | | | 280/730.2 |
| 8,757,715 | B2 * | 6/2014 | Yamaki ................. B60R 21/207 |
| | | | 280/730.2 |
| 8,807,594 | B2 * | 8/2014 | Mizobata ............. B60N 2/6009 |
| | | | 280/730.2 |
| 9,278,663 | B1 * | 3/2016 | Hallman ................ B60N 2/005 |
| 2007/0102905 | A1 * | 5/2007 | Ryan ..................... B60R 21/207 |
| | | | 280/730.2 |

(Continued)

Primary Examiner — Toan To
(74) Attorney, Agent, or Firm — Christopher G. Darrow; Darrow Mustafa PC (57) ABSTRACT Vehicle seats are described herein that include removable portions and fixed portions. The removable portions can be configured to be selectively removable from a vehicle, while the fixed portions can be configured to remain in the vehicle. The removable portions can include a seat base and portions of a seat back. The fixed portion can include an exterior side bolster of the seat. Further, the fixed portion can include one or more inflatable restraints. For example, the fixed portion can include a seat side airbag located within the exterior side bolster. Arrangements described herein can allow portions of the seat to be removed from the vehicle, while the inflatable restraints, such as airbags, remain in the fixed portion of the seat.

18 Claims, 6 Drawing Sheets (56) References Cited

U.S. PATENT DOCUMENTS

| | | | |
|---|---|---|---|
| 2010/0078921 A1* | 4/2010 | Ryan | B60R 21/207 |
| | | | 280/730.2 |
| 2011/0233980 A1* | 9/2011 | Hoshi | B60N 2/0232 |
| | | | 297/354.1 |
| 2012/0013108 A1* | 1/2012 | Yamaki | B60N 2/4235 |
| | | | 280/730.2 |
| 2012/0161486 A1* | 6/2012 | Stojanovic | B60N 2/26 |
| | | | 297/354.1 |
| 2014/0103626 A1* | 4/2014 | Seki | B60N 2/4228 |
| | | | 280/730.2 |
| 2016/0159305 A1* | 6/2016 | Makita | B60R 21/207 |
| | | | 280/728.2 |

\* cited by examiner

REMOVABLE VEHICLE SEATING

FIELD

The subject matter described herein relates in general to vehicle seating and, more particularly, to removable vehicle seating.

BACKGROUND

Modern vehicles commonly have a variety of safety equipment to protect occupants. For example, inflatable restraints can be integrated with vehicle components located in the interior of the vehicle. The inflatable restraint can include an airbag integrated into vehicle seating. For instance, the airbag can be a side seat airbag located within a side bolster of a vehicle seat. In response to an activation event, a sensor can activate an inflator to generate an inflation gas that rapidly inflates an inflatable portion to facilitate protection of an occupant.

Vehicles may be equipped with adjustable or removable seating to increase the adaptability of the vehicle for different cargo and occupant loading. Inflatable restraints incorporated into adjustable or removable seats may require a user to make one or more electrical connections when the seats are added and/or removed from the vehicle. Further, the seat can include live inflator assemblies when removed from the vehicle.

SUMMARY

A vehicle seat having a removable portion, a fixed portion, and an inflatable restraint is disclosed. The inflatable restraint is associated with the fixed portion such that both the fixed portion and the inflatable restraint can stay in and remain connected to the vehicle when the removable potion is removed from the vehicle.

In one respect, the present disclosure is directed to a vehicle seat. The seat can include a removable seat portion configured for selective removal from and installation in a vehicle. The removable seat portion can include a seat base and a seat back. The seat can further include a fixed seat portion configured to remain in the vehicle when the removable seat portion is removed from the vehicle. The fixed seat portion can be on an exterior side of the removable seat portion when the removable seat portion is installed in the vehicle. The seat can also include an inflatable restraint located within the fixed seat portion. The removable seat portion can be configured for operative connection to the fixed seat portion when installed in the vehicle and operative disconnection from the fixed seat portion when removed from the vehicle.

In another respect, the present disclosure is directed to a vehicle. The vehicle can include an interior defined by a vehicle floor and one or more sides. The vehicle can further include a vehicle seat. The seat can include a removable seat portion configured for selective removal from and installation in the interior. The removable seat portion can include a seat base and a portion of a seat back including an interior side bolster. The seat can further include a fixed seat portion operatively connected to the vehicle floor and configured to remain in the vehicle when the removable seat portion is removed from the vehicle. The fixed seat portion can be on an exterior side of the removable seat portion when the removable seat portion is installed in the vehicle. The seat can also include an inflatable restraint located within the fixed seat portion. The removable seat portion can be configured for operative connection to the fixed seat portion when installed in the vehicle and disconnection from the fixed seat portion when removed from the vehicle.

In yet another respect, the present disclosure is directed to a vehicle seat. The vehicle seat can include a removable seat portion configured for selective removal from and installation in a vehicle. The removable seat portion can include a base frame and a back frame. The back frame can be configured for rotational movement relative to the base frame. The seat can further include a fixed seat portion configured to remain in the vehicle when the removable seat portion is removed from the vehicle. The fixed seat portion can include a base frame and a bolster frame. The bolster frame can be configured for rotational movement relative to the fixed base frame. The seat can also include a side seat airbag operatively connected to the bolster frame of the fixed seat portion. The removable seat portion can be configured for operative connection to the fixed seat portion via latches located on the base frame and the back frame of the removable seat portion and strikers located on the fixed base frame and the bolster frame of the fixed seat portion.

DETAILED DESCRIPTION

This detailed description relates to vehicle seating having removable portions that increase the cargo flexibility of a vehicle. The seats can include a removable portion and a fixed portion. The removable portion can be selectively removed from and installed in the interior of the vehicle. The fixed portion of the seat can be configured to remain in the vehicle when the removable portion is removed. The fixed portion can include a side bolster of the seat. One or more inflatable restraints, such as a seat side airbag, can be included with the fixed portion of the seat. Arrangements described herein can allow the inflatable restraint to remain in the vehicle when the removable portion of the seat is removed from the vehicle. This can eliminate the need for a user to connect and/or disconnect the inflatable restraint each time the seat is removed and/or installed. Further, the fixed portion of the seat having the inflatable restraint eliminates conditions in which an inflatable restraint is located within a seat removed from the vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
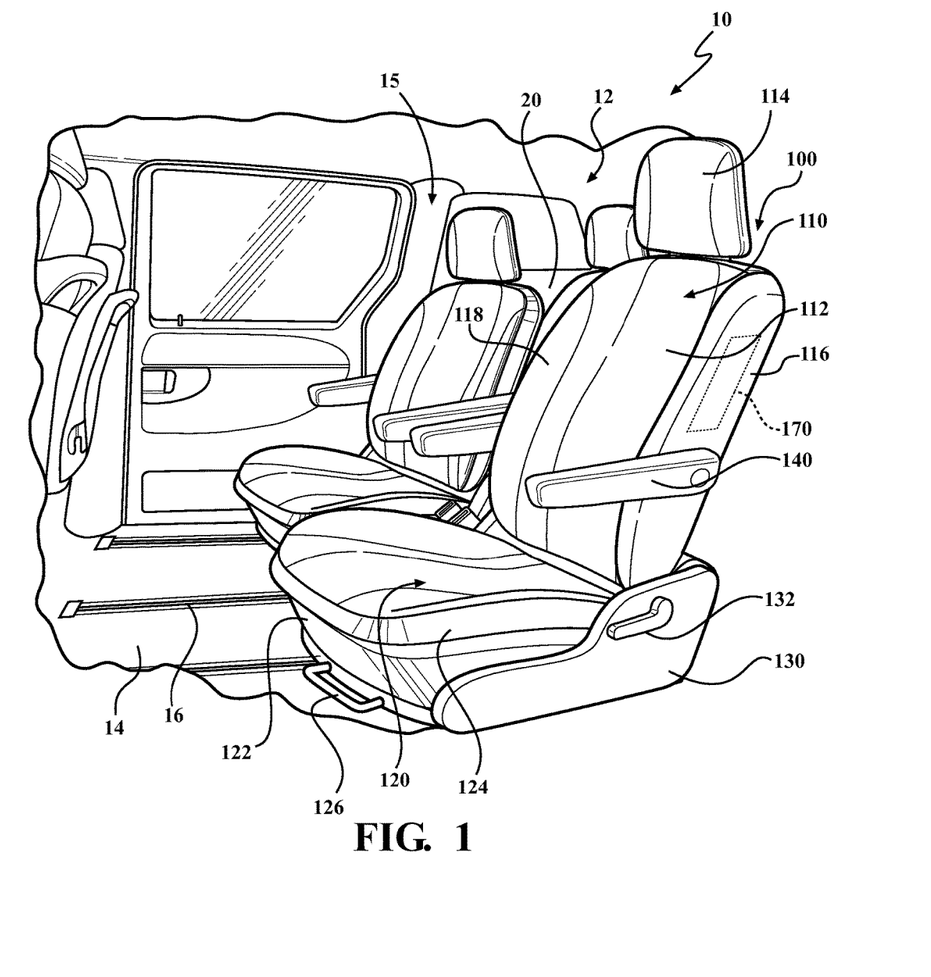
FIG. 1 is fragmented view of a portion of a vehicle interior having seats with removable portions.
Figure 5:
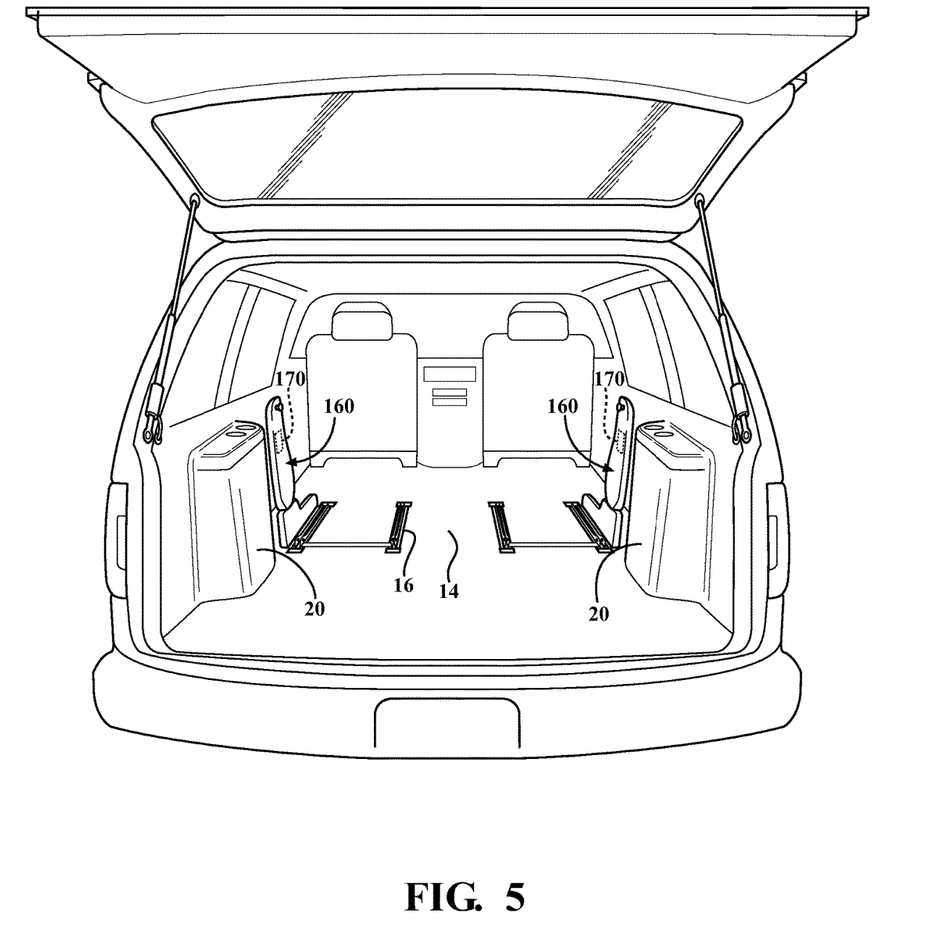
FIG. 5 is a rear view of the vehicle of FIG. 1 with removable portions of vehicle seats removed.
Figure 6:
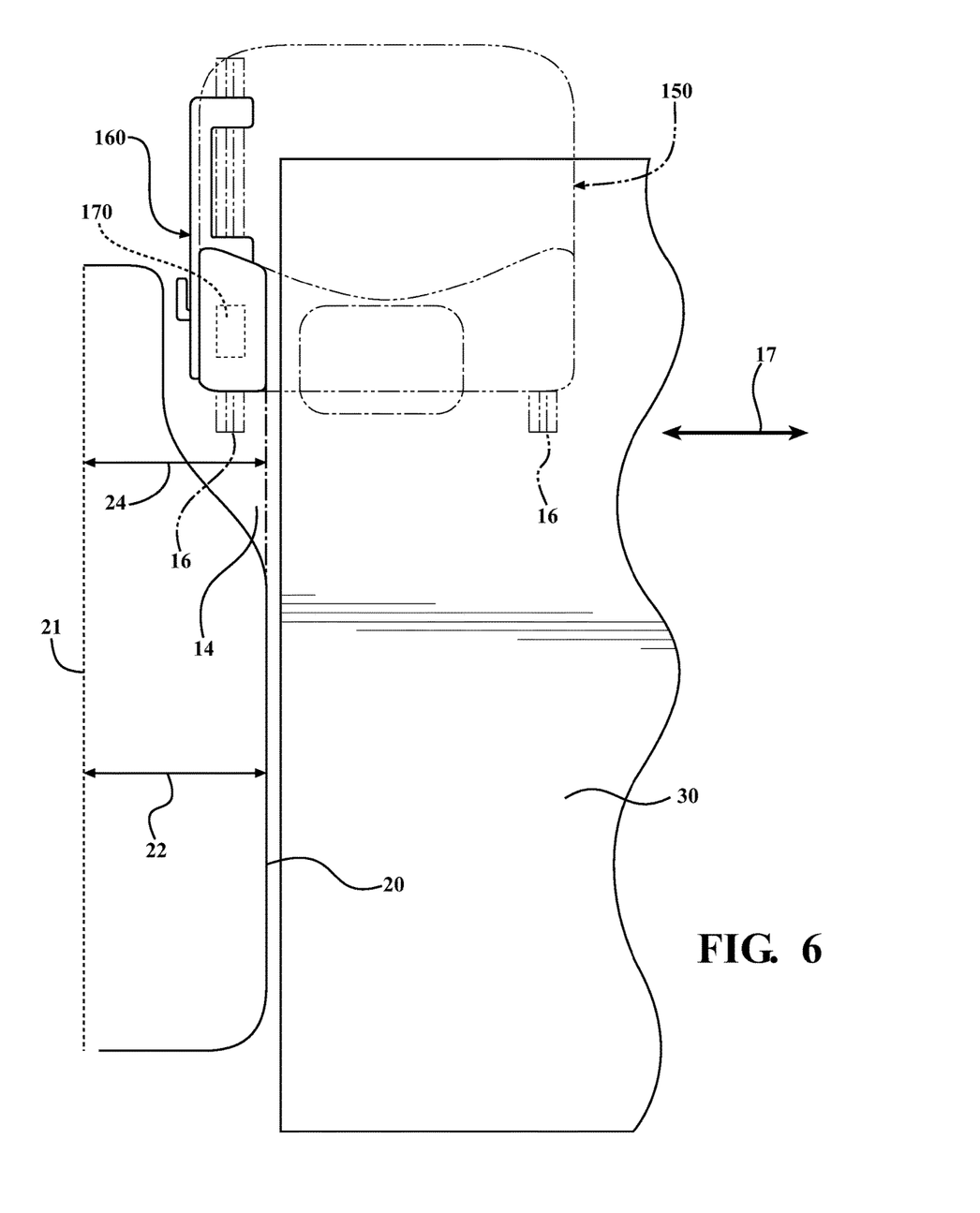
FIG. 6 is a fragmented top view of a portion of the interior of the vehicle of FIG. 1.

Referring to FIGS. 1, 5 and 6, an example of a vehicle 10 is shown. As used herein, "vehicle" means any form of motorized transport. In one or more implementations, the vehicle 10 can be an automobile. While arrangements will be described herein with respect to automobiles, it will be understood that embodiments are not limited to automobiles. In some implementations, the vehicle 10 may be a watercraft, an aircraft, a train, a space craft or any other form of powered transport.

The vehicle 10 can define an interior 12 that can be configured to transport one or more vehicle occupants. For example, the vehicle 10 can generally include a floor 14, sides 15, and a roof (not shown) that together can partially define the interior 12. In one or more arrangements, the vehicle 10 can include one or more seats 100 operatively connected to the floor 14. The term "operatively connected" as used throughout this description, can include direct or indirect connections, including connections without direct physical contact. For example, the seats 100 can be operatively connected to one or more rails 16 of the floor 14. The seats 100 can be configured for movement within the interior 12. For example, the seats 100 can be configured for longitudinal, or fore-and-aft, movement along the rails 16. In one or more arrangements described herein, portions of the seats 100 can be selectively removed from and installed in the vehicle 10. As used herein, "selectively removable" can describe any configuration in which a portion of the seat 100 can be removed from and installed in the interior 12 of the vehicle 10.

The seat 100 can include any combination of features to provide comfort, support, and/or safety to an occupant. In one or more arrangements, the seat 100 can include a back 110 and a bottom 120 to support an occupant. For instance, the back 110 can be configured for selected positioning in multiple orientations with respect to the bottom 120.

The bottom 120 can include a base 122 to provide support to the bottom 120 and aid in the operative connection of the seat 100 to the vehicle 10. The bottom 120 can include a bottom cushion 124 to provide comfort and support to an occupant. In one or more arrangements, the base 122 can include, or be operatively connected to, structure that allows the selective removal of a portion of the seat 100. For example, the base 122 can include a release lever 126. The release lever 126 can be configured to receive an input from a user to cause at least a portion of the seat 100 to be removable from the vehicle 10.

In one or more arrangements, the back 110 can include one or more cushions 112 and/or a headrest 114 to provide support for an occupant's back, head, and/or neck. In one or more arrangements, the back 110 can include side bolsters. As used herein, "bolster" can include any side portion of the back 110. The side bolsters can provide lateral support within the seat 100. For example, the back 110 can include an exterior side bolster 116 and an interior side bolster 118. The terms "interior" and "exterior" are used herein for convenience only, and are not intended to be limiting. As used in reference to the seat 100, exterior can describe portions closest to an exterior side of the vehicle 10, while interior can describe portions closest to a center of the interior 12 of the vehicle 10. The side bolsters 116 and 118 can include other features, such as armrests 140, seat controls, and/or seat belt guides, just to name a few possibilities.

In one or more arrangements, the seat 100 can include one or more safety devices for an occupant of the vehicle 10. For example, the seat 100 can include an inflatable restraint, such as an airbag 170. In one or more arrangements, the airbag 170 can be a seat mounted side airbag. As used herein, "inflatable restraint" and "airbag" can include any safety device configured to provide restraint or cushioning to an occupant within the vehicle 10 upon activation. The airbag 170 can be a seat side airbag, but other inflatable restraints can include other types of airbags, active head rests, and/or inflatable seat belts. The inflatable restraints can be configured to be activated or deployed based on a signal received from another vehicle component. For example, a vehicle electronic control unit (ECU) can send a signal to the inflatable restraint to activate or deploy based on an activation event. As used herein, the term "activation event" can be any event in which it is desired for an inflatable restraint to activate or deploy. Some examples of activation events can include a collision involving the vehicle 10, sudden changes in measured acceleration or deceleration of the vehicle 10 or occupants, rollover of vehicle 10, and/or vehicle component failure. In one or more arrangements, a vehicle ECU can determine if an activation event occurs and can send an activation signal to one or more inflatable restraints in response to the activation event.

Figure 3:
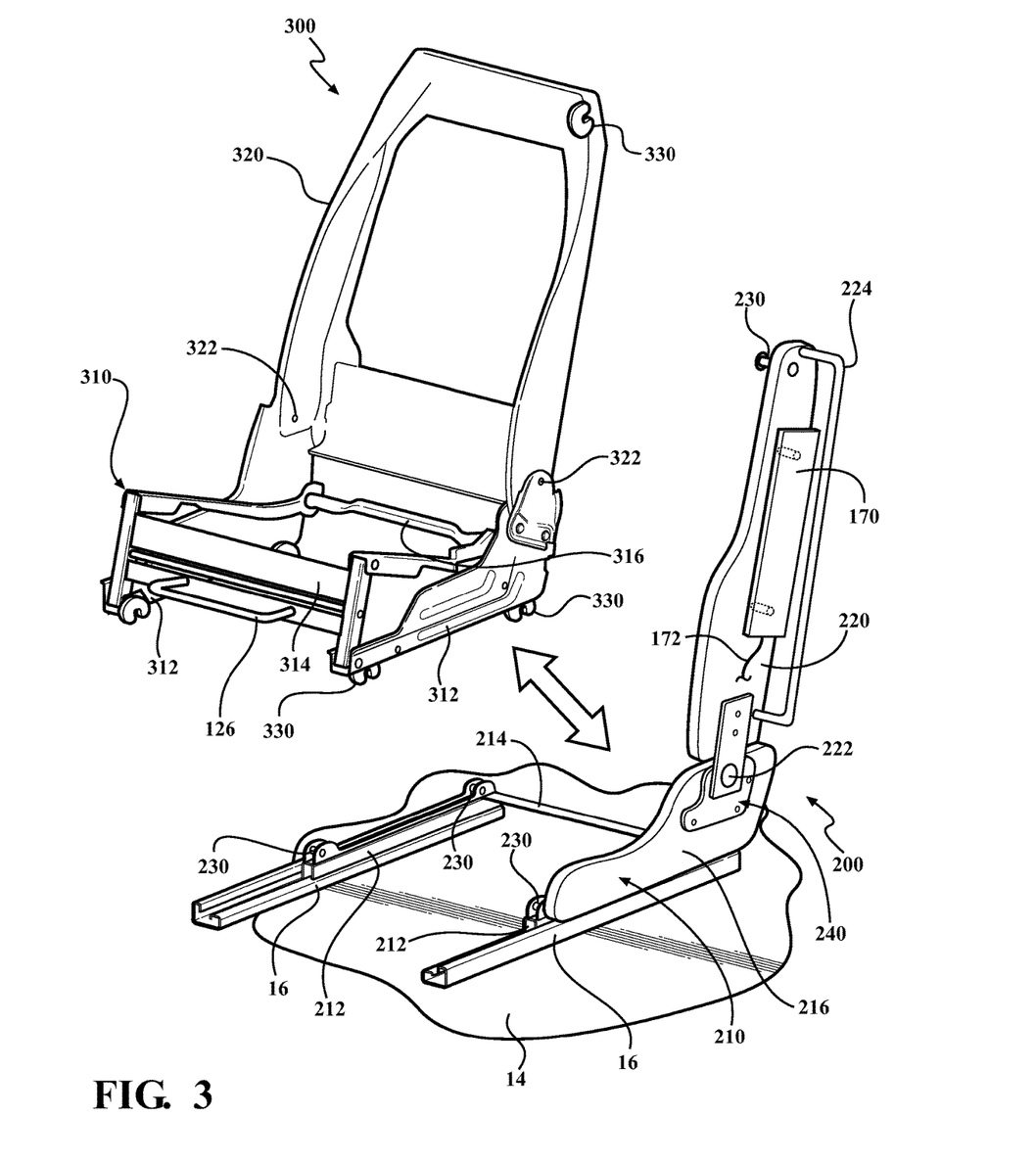
FIG. 3 is a perspective view of a first example of seat frames of the seat of FIG. 2.
Figure 4:
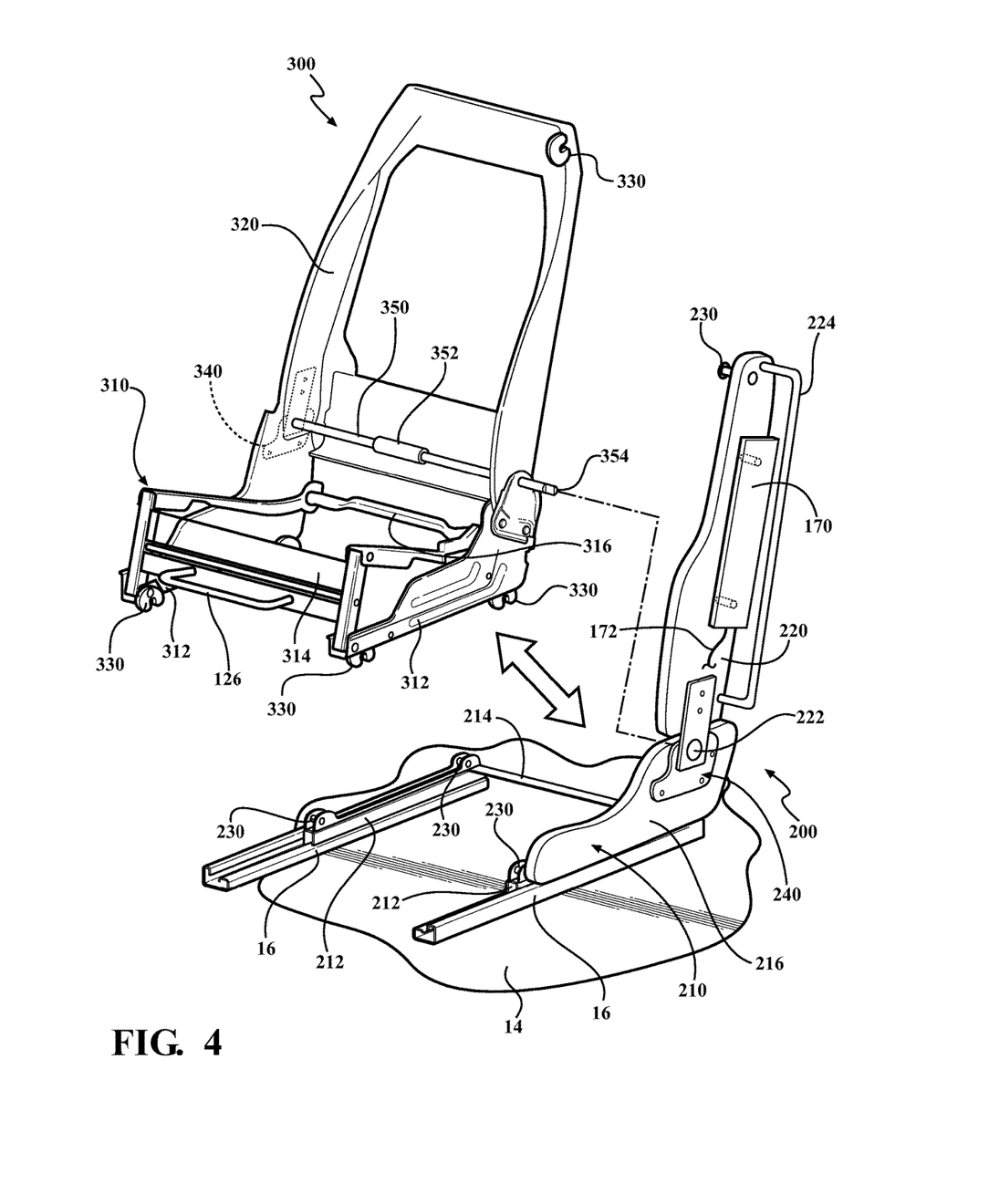
FIG. 4 is a perspective view of a second example of seat frames of the seat of FIG. 2.

In one or more arrangements, the airbag 170 can be a seat side airbag configured to deploy from a portion of the seat 100. The airbag 170 can include an inflatable portion configured to deploy between an occupant of the seat 100 and a side of the vehicle 10. In one or more arrangements, the airbag 170 can include an inflator configured to introduce gas to the inflatable portion. For example, the airbag 170 can include a pyrotechnic and/or compressed gas type inflator. In one or more arrangements, the airbag 170 can be positioned within a side bolster, such as the exterior side bolster 116. As shown in FIGS. 3 and 4, the airbag 170 can be operatively connected to a frame portion of the exterior side bolster 116. In one or more arrangements, the airbag 170 can be in electric communication to one or more vehicle components via wiring 172. For example, the airbag 170 can be connected to the wiring 172 that extends downward and into the floor 14 of the vehicle 10 to connect to other vehicle systems, such as an airbag ECU.

Figure 2:
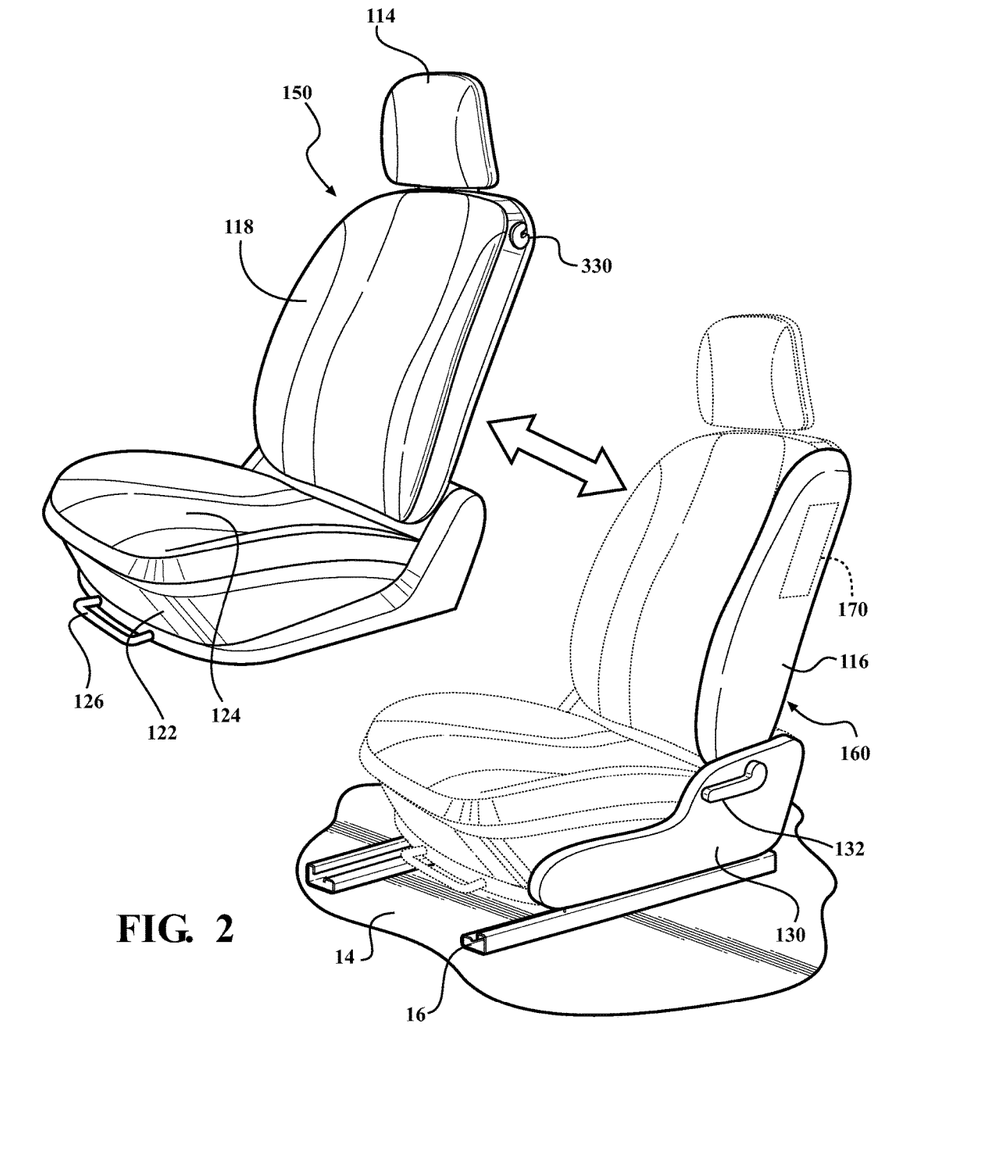
FIG. 2 is perspective view of an exemplary vehicle seat having a removable portion and a fixed portion.

In one or more arrangements, the seat 100 can include a removable portion 150 and a fixed portion 160. As used herein, "removable portion" can include any section of the seat 100 configured for selective attachment and removal from other sections of the seat 100 and/or other vehicle components. The term "fixed portion" used in relation to the seat 100 can include any section of the seat 100 configured to remain connected to one or more vehicle components during the removal of the removable portion 150. With reference to FIG. 2, the removable portion 150 can include the seat base 122, the bottom cushion 124, and a portion of the seat back 110 including the headrest 114 and the interior side bolster 118.

In one or more arrangements, the fixed portion 160 can be configured to remain in the vehicle 10 when the removable portion 150 is removed. For instance, the fixed portion 160 can either be irremovable from the vehicle, or selectively removable from the vehicle separate from the removal of removable portion 150. In one or more arrangements, the fixed portion 160 can include a side base 130 and the exterior side bolster 116. The airbag 170 can be included in the exterior side bolster 116 of the fixed portion 160 of the seat 100. Thus, the airbag 170 can be configured to remain in the vehicle 10 when the removable portion 150 is removed.

With reference to FIGS. 3 and 4, the seat 100 can include a plurality of frame members that can at least partially provide structural support for the seat 100. For example, the seat 100 can include a fixed frame 200 to support the fixed portion 160 and a removable frame 300 to support the removable portion 150. In one or more arrangements, cushions can be operatively connected to one or more of the frame members.

The removable frame 300 can have any suitable size, shape, and/or configuration. The removable frame 300 can include any number of individual frame members operatively connected to one another. For example, the removable frame 300 can include a base frame 310 and a back frame 320. In one or more arrangements, the back frame 320 can be configured for movement relative to the base frame 310. For instance, as shown in FIG. 3, the back frame 320 can rotate about pivots 322. The base frame 310 can have any suitable configuration to support the seat base 122. For instance, the base frame 310 can include a pair of side members 312, a front member 314, and a rear member 316 as shown in FIG. 3. The back frame 320 can have any suitable configuration to support a seat back portion of the removable portion 150. For example, the back frame 320 can include two side frame members connected by cross members near a top and a bottom portion of the back frame 320.

The fixed frame 200 can have any suitable configuration to support the fixed portion 160. In one or more arrangements, the fixed frame can include a base frame 210 and a bolster frame 220.

The base frame 210 can be configured for operative connection to the vehicle 10. In one or more arrangements, the base frame 210 can include one or more slide members 212 configured to engage the rails 16 located within the floor 14 of the vehicle 10. For example, the base frame 210 can include two slide members 212. One or more cross members 214 can extend between each of the slide members 212. In one or more arrangements, the base frame can include a side frame 216 operatively connecting the base frame 210 and the bolster frame 220. For example, the side frame 216 can provide support and structure for the side base 130.

In one or more arrangements, the bolster frame 220 can be operatively connected to, and extend from, the side frame 216. In one or more arrangements, the airbag 170 can be operatively connected to the bolster frame 220. For instance, the airbag 170 can be positioned on an exterior side of the bolster frame 220 and be operatively connected by one or more fasteners, one or more forms of mechanical engagement, one or more adhesives, one or more forms of welding, and/or one or more forms of brazing, just to name a few possibilities. The airbag wiring 172 can extend along one or more portions of the fixed frame 200. For example, the wiring 172 can extend down the bolster frame 220 towards the floor 14 of the vehicle. In one or more arrangements, the bolster frame 220 can include cushion supports 224. The cushion supports 224 can be configured to provide support, shape, and/or attachment locations for cushions of the seat 100. For example, cushions can be positioned over the cushion supports 224 within the exterior bolster 116.

In one or more arrangements, the removable frame 300 and/or the fixed frame 200 can include attachment mechanisms to allow the removable portion 150 to be operatively connected to the fixed portion 160 within the vehicle 10. For example, the removable frame 300 can include one or more latches 330. For example, the base frame 310 of the removable frame 300 can include four latches 330 as shown in FIGS. 3 and 4. Further, the back frame 320 of the removable frame 300 can include a latch 330. In one or more arrangements, the fixed frame 200 can include one or more strikers 230. For example, the base frame 210 can include four strikers 230 and the bolster frame 220 can include one striker 230. Each latch 330 of the removable frame 300 can be configured to engage a striker 230 of the fixed frame 200. Thus, in the non-limiting example shown in FIGS. 3 and 4, the removable frame 300 can be operatively connected to the fixed frame 200 at both the seat bottom 120 and the seat back 110. The attachment mechanisms, such as the latches 330, can be in electrical or mechanical communication with release inputs. For instance, a user can provide an input to cause the latches 330 to disengage with the strikers 230. In one non-limiting example, the release lever 126 can be in mechanical communication with one or more of the latches 330.

In one or more arrangements, the seat 100 can include one or more recliners. The recliner can be configured to allow selective movement of the seat back 110 relative to the seat bottom 120. As used herein, "recliner" can include any physical structure that allows for selective movement of the seat back 110 relative to the seat bottom 120. For instance, the recliner can be any mechanical or electro-mechanical device that allows for the seat back 110 to be positioned in multiple positions relative to the seat bottom 120. The recliner can be linked to one or more input sources to allow a user to change the configuration of the seat 100. For example, the recliner can be in physical communication with the recliner lever 132 (shown in FIGS. 1 and 2). Alternatively or in addition, the recliner can be in electrical communication with an electronic input. For example, the recliner can be in electrical communication with one or more power sources, one or more motors, and/or one or more inputs.

In one or more arrangements, the seat 100 can include one recliner 240, as shown in the example of FIG. 3. For instance, the recliner 240 can be operatively connected to the side base 216 and the bolster frame 220. Thus, the recliner 240 can allow rotational movement of the bolster frame 220 relative to the side base 210. The recliner 240 can be mechanically linked to the recliner lever 132. In some arrangements, the removable frame 300 can operatively connect to the bolster frame 220 to allow rotational movement of the back frame 320 relative to the base frame 310 through pivots 322 as the bolster frame 220 is allowed to rotate via the recliner 240.

In one or more arrangements, the seat 100 can include two recliners to allow the back 110 to be positioned in different angular positions relative to the seat bottom 120. For instance, the fixed frame 200 include the recliner 240 positioned between the side base 210 and the bolster frame 220. In one or more arrangements, the removable frame 300 can also include a recliner 340 operatively connected to the base frame 310 and the back frame 320, as shown in FIG. 4. In one or more arrangements, the recliner 340 can be positioned on an interior portion of the removable frame 300 to allow recliner devices to be at both the interior and exterior sides of the seat 100.

In one or more arrangements, the recliners 240 and 340 can be mechanically or electrically linked to transfer an input from one source to both recliners. For instance, an input received at the recliner lever 132 can be transferred to both recliners 240 and 340. In one or more arrangements, recliners 240 and 340 can be mechanically linked via a cross talk tube 350. For instance, the cross talk tube 350 can transfer rotational movement and forces from one recliner to the other. In one non-limiting example, a user can rotate the recliner lever 132 which can provide a rotational input that is applied to the recliner 240 located at the fixed frame 200 and to the recliner 340 located at the removable frame 300 via the cross talk tube 350.

The cross talk tube 350 can have any suitable size, shape, and/or configuration within the removable portion 150 of the seat 100. For instance, the cross talk tube 350 can have portions having substantially cylindrical shapes, with substantially circular cross-sectional shapes. In one or more arrangements, the cross talk tube 350 can extend between the pivots 322 of the removable frame 300. The cross talk tube 350 can be operatively connected to the recliner 340 at one end. The cross talk tube can further include a connection end 354 that is configured to engage and operatively connect to the recliner 240 and/or recliner lever 132 located at the fixed portion 160 of the seat 100. In one or more arrangements, the connection end 354 of the cross talk tube can be "keyed" or otherwise configured to engage a similarly shaped receiving structure allow rotational inputs to be transferred between recliners. For instance, the keyed connection end 354 can include one or more substantially flat surfaces. In one example, the connection end 354 can taper to have a cross-sectional shape of substantially a semi-circle. The keyed connection end 354 can be configured to engage an aperture in the recliner 240 and/or recliner lever 132.

The cross talk tube 350 can be configured to extend and/or contract to facilitate operative connection with the recliner 240 when the removable portion 150 of the seat 100 is installed in the vehicle. For instance, the cross talk tube 350 can include compression joint 352 to allow portions of the cross talk tube 350 to move relative to one another along a length direction of the cross talk tube 350. In one or more arrangements, the compression joint 352 can include a spring configured to bias the cross talk tube 350 towards an expanded configuration. The spring can be configured to compress when the connection end 354 engages the recliner 240 and/or recliner lever 132.

Referring now to FIG. 5, the vehicle 10 can be configured to support two seats in a rear portion of the vehicle 10. Each of the two removable portions 150 are shown removed from the vehicle 10, and the two fixed portions 160 are shown remaining within the vehicle 10. The interior 12 of the vehicle 10 can have additional features based on the structure of the vehicle 10. For example, trim 20 can be included with one or more sides of the interior 12 to cover vehicle components such as wheel wells. The trim 20 can extend in a lateral direction 17 into the interior 12 of the vehicle 10. As used herein, "lateral direction" can include any direction having a transverse component extending from an exterior left or right side of the vehicle 10 towards a center portion of the interior 12. For instance, the trim 20 can extend from a left side and/or a right side of the vehicle 10.

In one or more arrangements, the fixed portions 160 can be located within the vehicle 10 to provide increased cargo flexibility of the vehicle 10 when the removable portions 150 are removed. As shown in FIGS. 5 and 6, the fixed portion 160 of the seat 100 can be positioned within the vehicle 10 such that the fixed portion 160 does not extend farther to the center in a lateral direction 17 than other interior structures. For example, the fixed portion 160 can be positioned such that it does not extend farther toward a center of vehicle 10 in the lateral direction 17 than trim 20. In the example shown in FIG. 6, the trim 20 can be configured to extend in a lateral direction a maximum distance 22 from an exterior 21 of the vehicle 10. The fixed portion 160 of the seat 100 can be positioned such that a maximum distance 24 in a lateral direction is less than, or substantially equal to, the distance 22 of the trim 20.

In one or more arrangements, the position of the fixed portion 160 can impact cargo loading conditions of the vehicle 10. For example, as shown in FIG. 6, the location of the fixed portion 160 can allow a maximum width limitation of the cargo area of the vehicle to remain unchanged. In one or more arrangements, cargo items fitting between trim 20 can fit between the fixed portions 160. For example, a standard sheet of plywood 30 measuring four feet in width that fits between the trim 20 will fit with fixed portions 160 located inside the vehicle 10.

It will be appreciated that arrangements described herein can provide numerous benefits, including one or more of the benefits mentioned herein. For example, arrangements described herein can provide occupant and cargo flexibility by providing removable portions of vehicle seating. Such arrangements can include a fixed portion of a seat and a removable portion of the seat. The fixed portion of the seat can include an exterior side bolster that remains in the vehicle when a removable seat portion is removed from the vehicle. Inflatable restraints, such as a seat side airbag, can be incorporated within the side bolster of the fixed portion of the seat. Thus, arrangements described herein can allow the removable seat portions to be removed from the vehicle, while allowing the inflatable restraints to remain connected to the vehicle. Such arrangements can allow cargo area within a vehicle to be maximized with the removal of the removable portion of the seat. The fixed portion of the seat can allow electrical and pyrotechnical features of an inflatable restraint to remain in the vehicle, avoiding customer abuse outside the vehicle.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle seat, comprising:
 a removable seat portion configured for selective removal from and installation in a vehicle, the removable seat portion including a seat base and a seat back, the removable seat portion further including a base frame pivoting relative to a back frame;
 a fixed seat portion configured to remain in the vehicle when the removable seat portion is removed from the vehicle, the fixed seat portion being on an exterior side of the removable seat portion when the removable seat portion is installed in the vehicle, wherein the removable seat portion and the fixed seat portion are operatively connected together through a plurality of latches and strikers that selectively engage with one another; and an inflatable restraint located within the fixed seat portion, the removable seat portion being configured for operative connection to the fixed seat portion when installed in the vehicle and for disconnection from the fixed seat portion when removed from the vehicle.

2. The vehicle seat of claim 1, wherein the fixed seat portion is operatively connected to at least one seat rail located within a floor of the vehicle.

3. The vehicle seat of claim 1, wherein the fixed seat portion extends along an exterior side of the seat back and the inflatable restraint is a seat side airbag located adjacent the seat back.

4. The vehicle seat of claim 3, wherein the seat side airbag is located within a side seat bolster.

5. The vehicle seat of claim 1, wherein the fixed seat portion further includes a base frame and a bolster frame,
the base frame of the removable seat portion is configured for operative connection to the base frame of the fixed seat portion, and
the back frame is configured for operative connection to the bolster frame.

6. The vehicle seat of claim 5, wherein the bolster frame and the back frame are configured to rotate in unison relative to the base frame of the fixed seat portion.

7. The vehicle seat of claim 5, further including a recliner operatively connected to the bolster frame and the base frame of the fixed seat portion, the recliner configured to allow the bolster frame to be positioned in two or more angular positions relative to the fixed base frame.

8. The vehicle seat of claim 7, wherein the recliner is a first recliner, further including a second recliner operatively connected to the base frame of the removable frame and the back frame, the second recliner configured to allow the back frame to be positioned in the two or more angular positions relative to the base frame.

9. The vehicle seat of claim 8, wherein the first recliner and the second recliner are connected in mechanical communication via a cross talk tube.

10. A vehicle, comprising:
an interior defined by a vehicle floor and one or more sides;
a vehicle seat including:
a removable seat portion configured for selective removal from and installation in the interior, the removable seat portion including a seat base and a seat back, the removable seat portion further including a base frame pivoting relative to a back frame;
a fixed seat portion operatively connected to the vehicle floor and configured to remain in the vehicle when the removable seat portion is removed from the vehicle, the fixed seat portion being on an exterior side of the removable seat portion when the removable seat portion is installed in the vehicle, wherein the removable seat portion and the fixed seat portion are operatively connected together through a plurality of latches and strikes that selectively engage with one another; and an inflatable restraint located within the fixed seat portion,
the removable seat portion being configured for operative connection to the fixed seat portion when installed in the vehicle and for disconnection from the fixed seat portion when removed from the vehicle.

11. The vehicle of claim 10 wherein the inflatable restraint is a seat side airbag located within an exterior side bolster of the fixed seat portion.

12. The vehicle of claim 10, wherein the fixed seat portion further includes a base frame and a bolster frame,
the base frame of the removable seat portion is configured for operative connection to the base frame of the fixed seat portion, and
the back frame is configured for operative connection to the bolster frame.

13. The vehicle of claim 12, wherein the bolster frame and the back frame are configured to rotate in unison relative to the base frame of the fixed seat portion.

14. The vehicle of claim 12, further including:
a first recliner operatively connected to the bolster frame and the base frame of the fixed seat portion, the first recliner configured to allow the bolster frame to be positioned in two or more angular positions relative to the fixed base frame; and
a second recliner operatively connected to the base frame of the removable frame and the back frame, the second recliner configured to allow the back frame to be positioned in the two or more angular positions relative to the base frame.

15. The vehicle of claim 14, wherein the first recliner and the second recliner are connected in mechanical communication via a cross talk tube.

16. The vehicle of claim 10, further including at least one trim component operatively connected to the at least one side of the vehicle, the at least one trim component extending in a lateral direction towards a center of the interior, and wherein the fixed seat portion is positioned such that it does not extend farther than the at least one trim component in the lateral direction towards the center of the interior.

17. The vehicle of claim 16, wherein the at least one trim component covers a rear wheel well of the vehicle.

18. A vehicle seat, comprising:
a removable seat portion configured for selective removal from and installation in a vehicle, the removable seat portion including a base frame and a back frame, the back frame configured for rotational movement relative to the base frame;
a fixed seat portion configured to remain in the vehicle when the removable seat portion is removed from the vehicle, the fixed seat portion including a base frame and a bolster frame, the bolster frame configured for rotational movement relative to the fixed base frame; and
a side seat airbag operatively connected to the bolster frame of the fixed seat portion in a side seat bolster,
the removable seat portion being configured for operative connection to the fixed seat portion via latches located on the base frame and the back frame of the removable seat portion and strikers located on the fixed base frame and the bolster frame of the fixed seat portion.

* * * * *